Nov. 25, 1958  H. O. KLINKE  2,862,101
METHOD AND APPARATUS FOR WELDING BANDS ON SHELLS
Filed Feb. 1, 1956  4 Sheets-Sheet 2
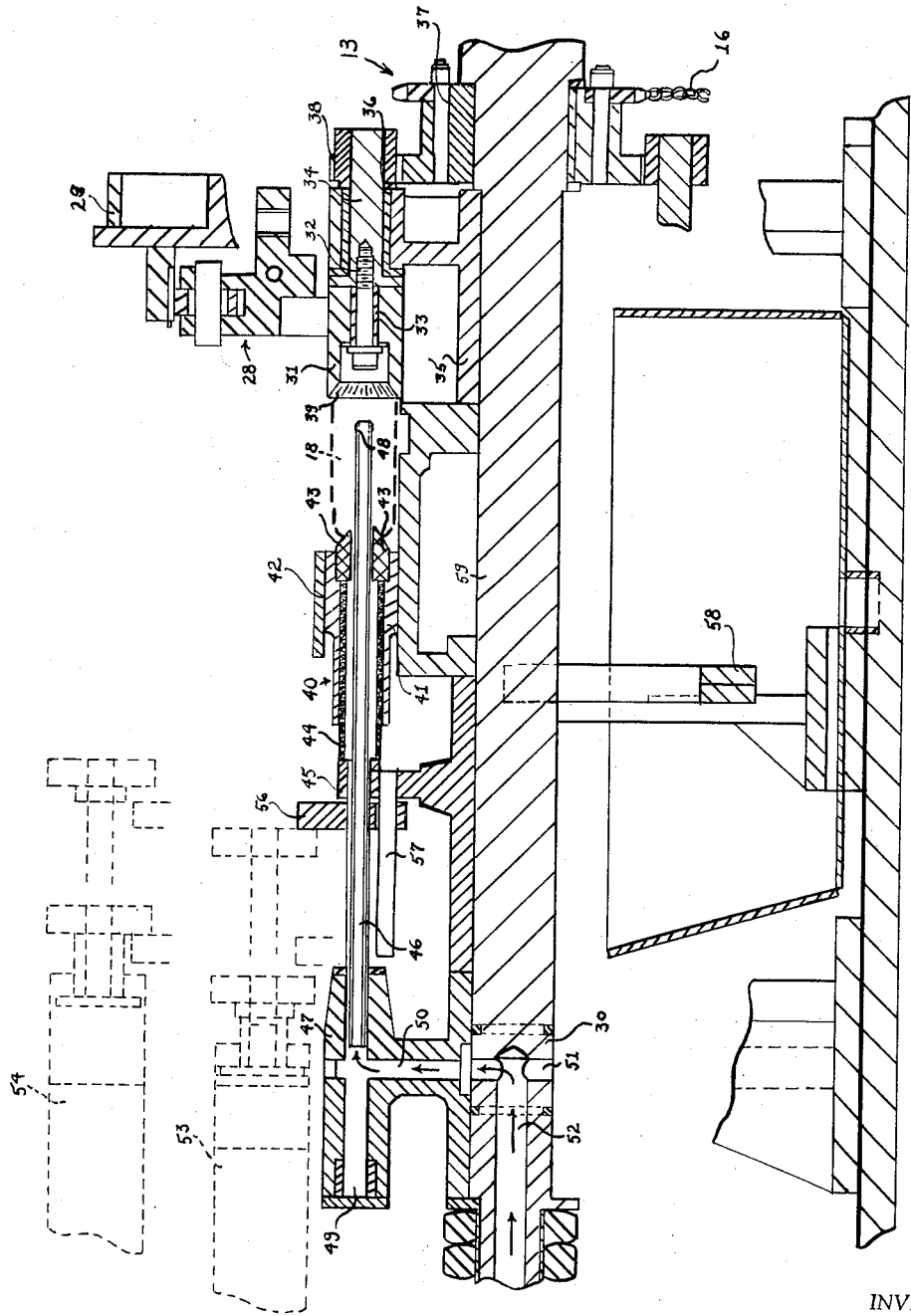
INVENTOR
HENRY O. KLINKE
BY Francis J. Kempay
ATTORNEY Nov. 25, 1958 H. O. KLINKE 2,862,101
METHOD AND APPARATUS FOR WELDING BANDS ON SHELLS
Filed Feb. 1, 1956 4 Sheets-Sheet 3
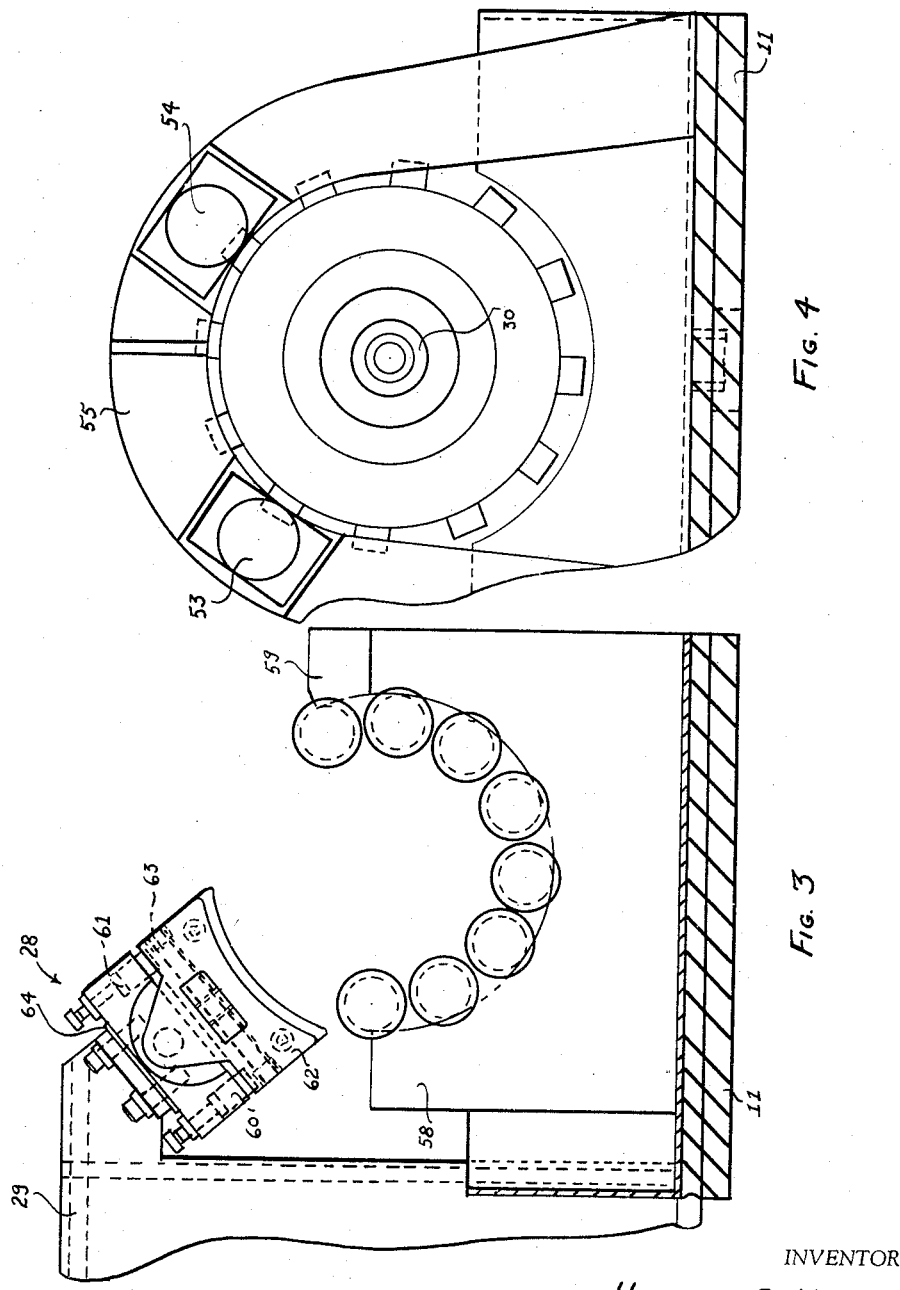
INVENTOR
HENRY O. KLINKE
BY Francis J. Klenbad
ATTORNEY Nov. 25, 1958  H. O. KLINKE  2,862,101
METHOD AND APPARATUS FOR WELDING BANDS ON SHELLS
Filed Feb. 1, 1956  4 Sheets-Sheet 4
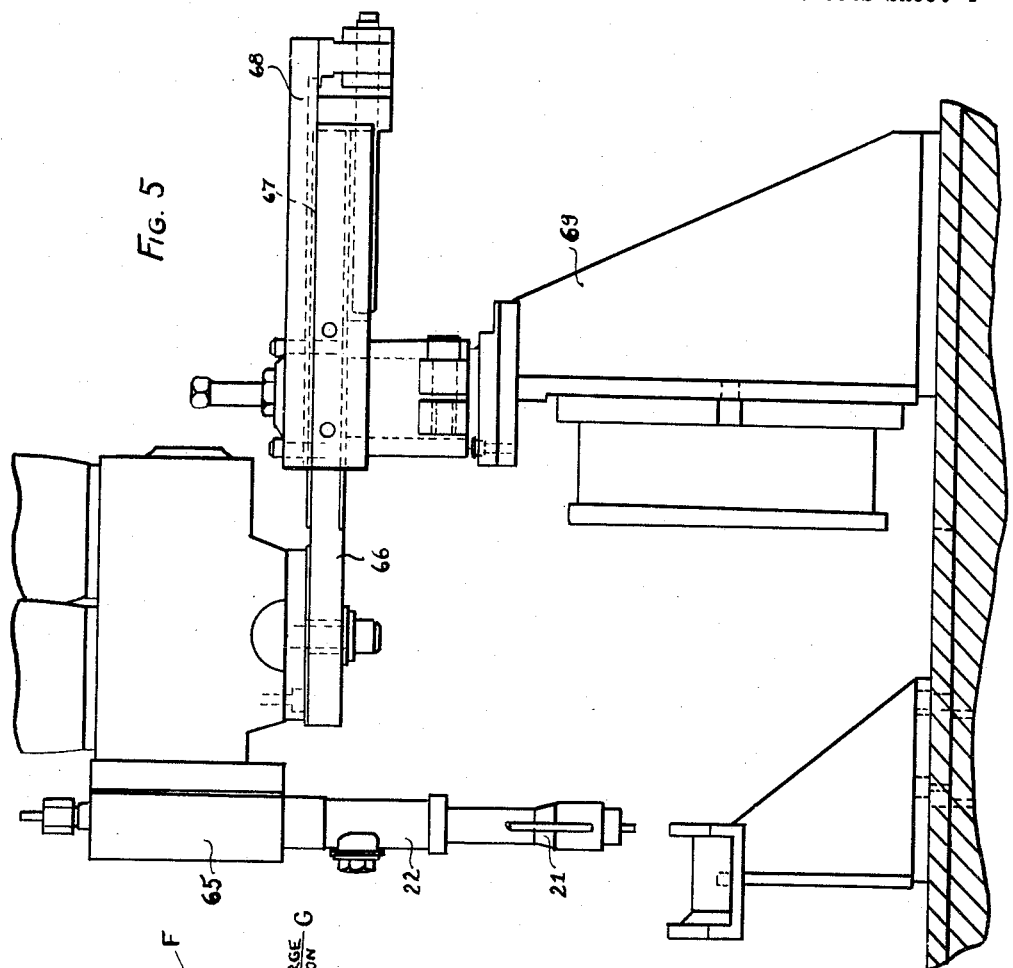
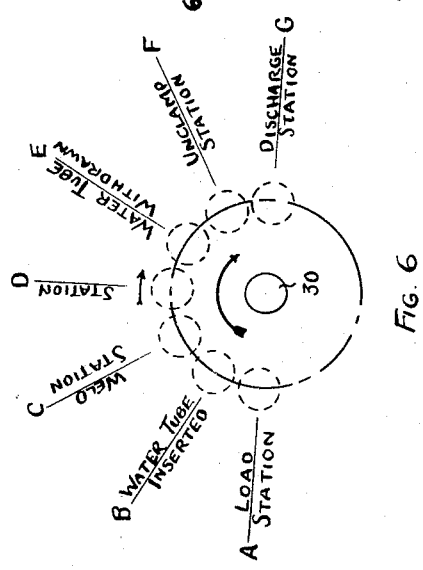
INVENTOR
HENRY O. KLINKE
BY Francis J. Klempay
ATTORNEY

United States Patent Office 2,862,101
Patented Nov. 25, 1958

2,862,101

METHOD AND APPARATUS FOR WELDING BANDS ON SHELLS

Henry O. Klinke, Warren, Ohio, assignor to The Taylor-Winfield Corporation, Warren, Ohio, a corporation of Ohio Application February 1, 1956, Serial No. 562,687

20 Claims. (Cl. 219—137)

The present invention relates to the welding art in general and more particularly to an improved method and apparatus for depositing, by the shielded arc method, a band of copper around the outer periphery of objects such as rifle shells in an expedient manner which allows substantially higher rates of production than have heretofore been known in the prior art.

The procedure of welding the bands directly on shells as distinguished from sinking the bands thereon has been generally accepted but there are several problems encountered which limit the rates of production and the quality of the bands on the shells since the process is a delicate one. As an example, if the point of the weld becomes too hot, the copper has a tendency to run therefrom, and if the point is too cool, not enough copper is deposited to insure a proper thickness. Also, when the shells are being individually banded by the shielded arc welding method, it has been necessary to extinguish and re-initiate the arc every time the operation is completed on one shell and another is moved into position which often results in a large volume of rejects as the weld does not have exactly the same characteristics at the time the weld is struck as it does a short time later.

It is therefore an object of the present invention to provide an improved method and apparatus for welding copper bands on shells whereby the welding may be carried out in a continuous manner and at high rates of production. I have found that by using my method and apparatus where the shells are rotated about their own axes and indexed at the proper time to a welding station, that it is possible to jump the arc from one shell to another without interruption, and production has been increased considerably by this method.

It is yet another object of the invention to provide a improved method and apparatus for banding shell casings which may be readily controlled to obtain a final product of high quality with a minimum of rejects. As indicated previously, the operation must be closely controlled to get the desired copper band on the shell as the band itself co-operates with the rifling in the bore of the gun or rifle to impart rotational motion to the shell and if the band tends to slip the shell is ineffective. It will be observed that the various steps in the welding operation are readily controlled by the operator of the apparatus.

Another object of the invention is to provide apparatus for the purposes stated and having the characteristics set forth above which, due to its specific configuration and compact nature, allows the welding operation to be carried out in a more or less automatic manner. It should be understood that because the welding operation is a temperamental one, certain other appurtenant equipment such as cooling means with the coolant impinging directly at the point of weld must be provided and this greatly complicates the problem of providing an automatic machine for banding shells.

The above and other objects and advantages of the invention will become apparent upon full consideration of the following detailed specification and accompanying drawing wherein is found an illustrated embodiment of the invention.

In the drawing:

Figure 2 is a partial side sectional view showing in detail the construction of the shell holding apparatus and other appurtenant equipment embodied in Figure 1;

Figures 3 and 4 are end sectional views of Figure 2;

Figure 5 is a side elevation of the various mechanisms for controlling the position of the welding torch; and Figure 6 is a schematic representation of the indexing stations of my apparatus with the operations performed at each station indicated thereon.

Figure 1:
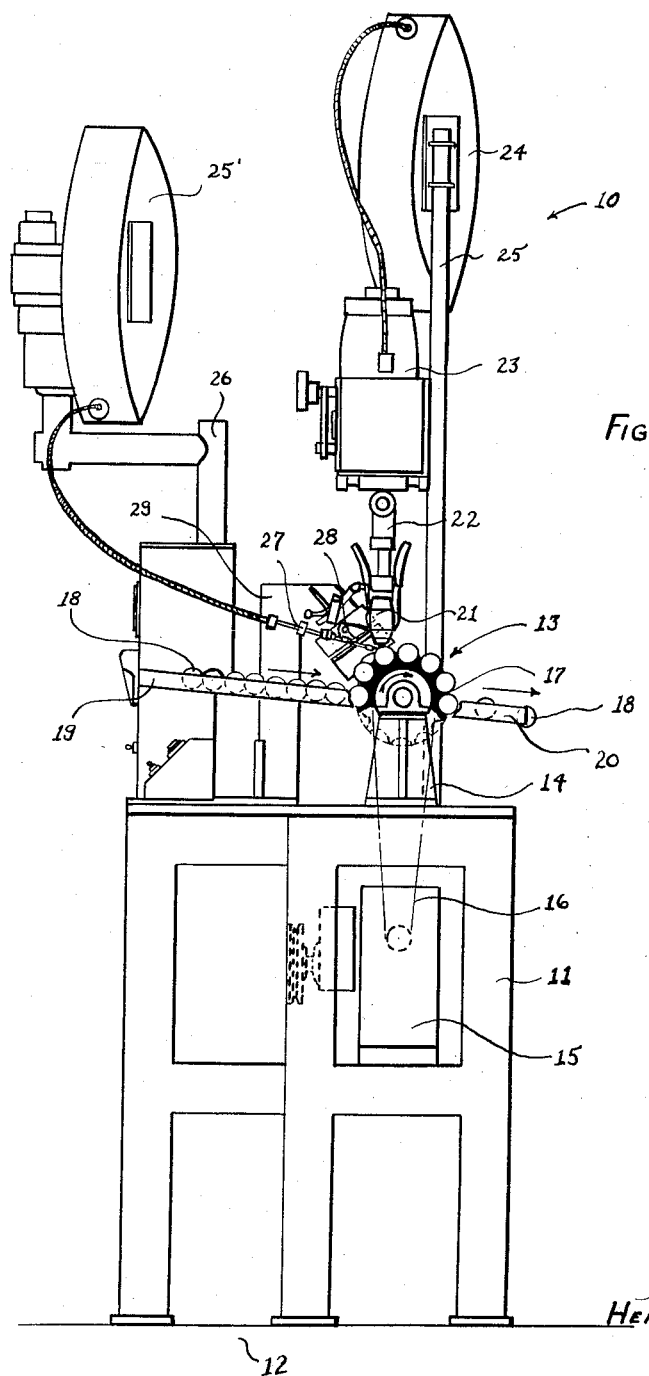
Figure 1 is a front elevation of a welding machine for banding shells constructed in accordance with the teachings of my invention.

Referring now to the drawing, and initially to Figure 1 thereof, the numeral 10 designates generally a welding machine for banding the outer periphery of shell casings with a strip of copper supported on a table 11 made from standard structural members resting on the concrete floor 12 of a plant, for example. The machine 10 consists of the shell holding and indexing unit 13 mounted on the table by suitable supports 14 for rotational movement in the direction of the arrow by means of an indexing mechanism such as an air operated ratchet type, not specifically shown, while the shells are adapted to be rotated about their own axes by the variable speed motor 15 and the chain drive 16 as will be hereinafter more fully described. As shown, there are a number of indentations or stations 17 along the drum 13 arranged to receive the shells 18 from the inclined loading chute 19, carry the same through successive steps of the banding operation, and then discharge them to the unloading chute 20.

Supported in fixed relation above the shell holding and indexing drum 13 is a welding head 21 adapted to be connected through suitable conduits 22 to an air reduction head 23 which is operative to supply inert gas at the point of weld thus shielding the arc and the weld from the effects of the atmosphere and oxygen contained therein. The welding head 21 is also adapted to receive a continuous strip of copper band from a dust protected wire reel unit 24 supported by a tubular member 25 above the table 11. Auxiliary equipment, not specifically shown, is adapted to connect the wire fed from the reel 24 to a suitable supply of electrical power and feed the same at a predetermined and controlled rate of speed toward the indexing drum 13 in a path guided and determined by the positioning of the welding head 21 so that an arc may be struck between the copper strip and the shell thus causing the copper to melt and be deposited on the shell 18 at the welding station.

Another dust protected reel unit 25' is rigidly attached to table 11 by means of the tubular supports 26 laterally of the reel unit 24 above the indexing unit 13 and is operative to feed a second wire of copper to the point of weld through the holding device 27 at a predetermined speed. This wire is not connected to any source of electrical power. It is important to note the first copper strip or "hot" wire is fed from directly above in a vertical direction to the point of weld while the second or "cold" wire carrying no electrical current enters the welding area from a substantially horizontal direction. In the welding operation of banding the shells, it has been found advantageous to provide both the "hot" and "cold" strips of wire at the welding point because the welding temperatures are so high that if only a "hot" wire were used, an ineffective weld would result. The utilization of the second wire also allows a thicker layer of copper to be deposited on the shell periphery in a shorter time thus allowing faster operations.

To complete the electrical circuit of the welding apparatus, I provide a current collecting shoe 28 which rides on the rear end of at least two successive holders for the shells as will be hereinafter more fully explained, and is secured above the indexing unit 13 by the L-shaped member 29. In this manner, the electrical circuit is completed from a suitable supply through the vertically positioned "hot" wire and the arc to the shell casing and then by the contact shoe 28 back to ground or a terminal of opposite polarity of the supply source.

As indicated previously, the operation of welding bands on shells is a temperamental one and certain other appurtenant equipment must be provided along with means for rotating the shells about their own axes while indexing the same about a common axis to the welding station. In the illustrated embodiment, see Figure 2, this is accomplished by the indexing unit 13 consisting of a central shaft 30 which mounts twelve radially extending and circumferentially spaced collets 31 of which only one is shown in the drawing, but it should be understood that the construction of the other collets and appurtenant equipment associated therewith is exactly the same. The collet 31 is secured by bolt 32 and insulated therefrom by a layer of insulating material 33 to a pinion gear member 34. The pinion gear member 34 is journaled in a carrying bracket 35 and supported for rotation by sleeve bearing 36 independently of the bracket 35 which is keyed to the shaft 30. The rotation of collets 31 is accomplished by the sprocket 37 cooperating with pinions 38 of the pinion gear member 34 and the sprocket 37 is connected by the chain drive 16 to the variable speed motor 15. In this manner the collets 31 are electrically insulated from the shaft 30 and adapted for rotation about their own axes independently of the movement of the central shaft 30.

The use of the collet 31 is to provide a means for rotating the shell 18 about its own axis and to do this some mechanism must be operative to hold the shell in the collet. It is noted that the face of the collet 31 is serrated at 39 to prevent the slipping of the shell when the collet is rotated. To forcibly hold the shell against the serrations 39, a spring loaded cartridge unit 40 is used consisting of an annular member 41 slidably received in the circular housing 42 which is also keyed to the shaft 30. The annular member 41 is fitted with a plurality of circumferentially spaced and horizontally projecting tips 43 made of some hard and abrasion resistant material, preferably carboloy, at one end, while the other end thereof is of decreased inner diameter to provide a shoulder for a coil spring 44. The coil spring 44 is supported on its extreme end by the stops 45 in such a manner that the annular member is under pressure of the spring 44 to hold the shell 18 tightly against the serrations 39 of the collet 31. It is noted that the outer end of the shell is held at spaced points by the tapered tips 43 so that the shell 18 is forced to rotate with the collet 31.

In order to get the desired quality of weld required for an acceptable final product in banding shells, it is necessary to impinge a stream of coolant directly under the point at which the weld is taking place. This presents various problems as the means of supplying the water to the weld point must be retracted and out of the way for loading and unloading the shells into or out of the collets 31. In my new and novel apparatus the water is supplied through the longitudinally extending conduit 46 which is slidably received through the coil spring 44, the center aperture in the annular member 41, and in the space between the tapered tips 43 intermediate its ends while one end is slidably received in a valving fixture 47 and the other end has a vertically directed opening 48 therein which is adapted, as will be further explained, at certain times to direct a stream of coolant to a point directly under the center line of the weld. The valving fixture 47 has an elongated horizontal passageway 49 therein adapted to slidably receive the end of the conduit 46 and this communicates through suitable borings and tappings 50—52 in itself and the shaft 30 to a suitable source of coolant, not shown. The passageway 50 cooperates with one of the axially spaced and radially directed bores 51 and thence through the central tapping 52 in the shaft 30 to the coolant source. The construction is such that only the tapping 52 need be connected to the source instead of each individual conduit 47 as is readily apparent.

The cooling water flows through the central port 52 in the manner depicted by the arrows in Figure 2 when the conduit 47 is positioned inside the shell 18. When the cooling tube is retracted out of the shell it effectively shuts off the coolant to the conduit 46 as its end blocks off the passageway 50 so that coolant is only flowing when the conduit 46 is within the shell 18. The movement of the conduit 46 into and out of the shell for ejection purposes is accomplished by two small fluid cylinders 53 and 54 (see Figure 4) positioned on the U-shaped bracket 55 opposite various stations to cooperate with projection 56 secured to the conduit 46 behind the cartridge unit 40. A suitable guide 57 may also be provided to slidably guide the projection 56 as the cylinder 53 is operative to push the water tube 46 into the shell at one station and the cylinder 54 is used to pull the water tube out at another station. The relative positioning of the two air cylinders 53 and 54 is shown in Figure 2 of the drawing in broken lines without the U-shaped bracket 55.

In considering the loading and ejection of the shells from the collets 31, it is seen that some provision must be arranged for retracting the spring-loaded cartridge units 40, and in my apparatus, this is accomplished by stationary cam 58 which, as shown in Figure 3, is positioned opposite the units 41 and encircles approximately half of the station of the indexing mechanism 13. One end of this stationary cam 58 is generated or tapered as shown at 59 to wedge the cartridge 40 backward and release the shell. The cartridge 40 is held in this retracted position through successive index periods until it reaches the other end of the cam 58 and is then operative to hold another shell in position for banding.

Figure 3 also shows in greater detail the construction of the spring-loaded current collecting shoe 28 which rides at all times on at least two of the collets 31 so there is no interruption in the current flow and the arc may jump from one shell to another without being extinguished and interrupted. A pair of spring assemblies 60 and 61 apply pressure to a pivotally mounted collector 62 so that good electrical contact is always maintained between the collets and the shoe. A transversely extending bore 63 is provided for water cooling and the shoe 28 is insulated from the L-shaped support 29 by a layer of insulating material 64 as is the usual practice.

As indicated in the previous discussion, the proper positioning of the welding head or torch 21 is very important in obtaining the desired quality of weld in a consistent manner, and I have provided mounting apparatus which is easily controlled to adjust the torch laterally, vertically or to an angled position on either side of the vertical. The conduits 22 are slidably received in the barrel 65 which adjusts up and down position of the head while the air reduction head 23 is supported by a beam 66 movable in the lateral direction in ways 67 of a fixture 68 rigidly secured to a platen 69 secured to the table 11. Suitable mechanism, not specifically depicted, is also provided to tilt the head in a side-to-side manner in order that freedom in placing the welding head is afforded. Also provided are water cooling means to protect the welding head from the high degree of heat generated.

Now considering the operation of the shell banding machine 10, it is assumed that the welding head 21 has been positioned at the proper place to achieve the desired quality of weld and that shells are available to be loaded in the loading chute 19. Observing Figure 6 of the drawing, it is noted that there are twelve stations 17 spaced about the axis 30, and that certain of these stations have been marked with the letters A—G for further reference. At station A, the shell 18 is loaded into the indexing drum 13 from the loading chute 19, and after a certain time, the drum 13 is indexed toward station B. During this step in the operations, the spring-loaded cartridge 40 passes over the end of the stationary cam 58 so that the tapered tips 43 force the shell back against the serrations 39 thereby starting it to rotate due to the movement of the collets 31 connected by the pinions 38, the sprocket 37, and the drive 16, to the variable speed motor 15. Also, while moving to station B, the collet 31 is forced into contact with the spring-loaded current collecting shoe 28. While at station B, the conduit 46 is inserted by means of the cylinder 53 and water is turned on as the end of the tube 46 passes the passage 50 and coolant is forced through the opening 48 to impinge directly under the place of weld. The drum is then indexed to station C and during indexing, the arc jumps from the proceeding shell to start banding the shell as it is rotated about its own axis at the welding speed. To complete the weld, copper wire is fed at a predetermined rate of speed from the reel unit 24 in the vertical direction while a second strip of wire enters generally horizontally to the "hot" wire from the reel unit 25'. The inert gas is supplied air reduction head 23 to substantiate the arc and thus a band of copper is applied to the outer periphery of the shell as it is rotated. When the weld is completed, the shell is indexed to station D and thence to station E where the conduit 46 is retracted by cylinder 54 in a like manner in which it was inserted, thus effectively shutting off the coolant. Moving from station E to F, the drum is again indexed and the shell is unclamped as the cartridge unit 40 is backed off by the stationary cam 58 having a generated end portion 59. At station G the shell, banded with a band of copper around the outer periphery thereof, is ejected to the discharge chute 20. After this station the collet 31 and other appurtenant equipment are indexed five additional times in the clockwise direction until it has reached station A and is again ready to receive another shell for banding.

It should be understood that although I have described the operations performed on one shell during the cycle of operations, that the other collets 31 are at a different station so that the process is continuous, resulting in high rates of production. In the illustrated embodiment there is shown twelve stations, but this is optional depending on the size of shell, thickness of band needed, etc., although I have found the machine illustrated to be especially useful in banding 30 millimeter shells.

It may be desirable, and somewhat of a necessity, to provide timing and sequencing apparatus, not specifically shown, to control the steps in the banding operation in order that they may be carried out in a fast and expedient manner. As an example, the actuation of the air cylinders 53 and 54 would probably be controlled by the indexing mechanism 13 which in turn might be regulated by the speed at which the shells and collets 31 are rotated about their own axis. The variable speed motor 15 should also be readily controllable to regulate the welding speed as necessary when the shells are being welded.

Although it is apparent that I have accomplished the object initially set forth by providing improved method and apparatus for welding copper bands on shells, attention is drawn to certain new and novel features of the apparatus which allow substantially higher rates of production and efficiency than has heretofore been known in the prior art. The physical arrangement is such that the spring-loaded current collecting shoe is riding at all times on at least two of the collects so that when the drum is indexed the arc jumps from one shell to another without being extinguished. Also, the cooling means is one of great utility in that the insertion and retraction of the conduit into the shell controls the flow of coolant and is so operative not to interfere with the ejection of the shells after banding. The cartridge units are compact and rugged in construction and allow the shells to be rotated about their own axes while being indexed through a predetermined cycle about a common central axis, and the movement and positioning of the welding head may be readily controlled to give the desired welds.

I have provided a method and apparatus for effectively and efficiently carrying out banding of shells where the rejects are a minimum and the resulting weld is one of the highest quality. Further, I have taught a method and apparatus therefor which is operative to complete a delicate operation at high speeds in an efficient manner.

It is apparent that many modifications and changes may be made in the form, arrangement, and number of elements disclosed in the foregoing description and accompanying drawing without departing from the spirit or teachings of the invention. Accordingly, I desire only such limitations to be imposed upon the following claims as are necessitated by the prior art.

I claim:

1. The method of welding a copper band around the outer periphery of shell casings by the shielded arc process comprising the steps of moving said shells in successive relation through a plurality of working stations, rotating said shells at a predetermined speed about their own axes, welding a copper band on said shells at one of said stations, and moving said shells at a predetermined time and speed while still being rotated about their own axes whereby the welding arc is caused to jump from one shell to another without being extinguished or interrupted.

2. The method of arc welding a band around the outer periphery of workpieces comprising the steps of indexing said workpieces about a central axis through a plurality of working stations, rotating said workpieces about their own axes at a predetermined speed independently of said indexing movement, welding said band to said workpieces at one of said stations, said indexing movement being such that the welding arc is caused to jump from one workpiece to another without being extinguished, and said predetermined speed of rotation being the welding speed.

3. The method of arc welding a copper band around the outer periphery of rifle shells comprising the steps of indexing said shells about a central axis through a plurality of working stations, welding said copper band to said shells at one of said stations, feeding a copper wire which is connected to a source of electrical potential in a generally vertical direction toward the shell at said welding station, feeding a second copper wire toward said welding station in a direction substantially normal to said first wire, and said indexing movement being such that the welding arc is caused to jump from one shell to another without being extinguished.

4. The method according to claim 3 further characterized by rotating said shells about their own axes in the direction of index independently of said indexing movement at the welding speed.

5. The method of welding a copper band around the outer periphery of shell casings comprising the steps of indexing said shells through a plurality of working stations, inserting and retracting cooling means into and out of said shells at two of said stations, welding said copper band to said shells at another station, feeding a copper wire connected to a source of electrical potential toward the shell in said welding station in a generally vertical direction, feeding a second copper wire toward said shell in a substantially horizontal direction, shielding the point of juncture of said wires and said shell with an inert gas, rotating said shells about their own axes independently of said indexing movement at the welding speed, and said indexing movement being such that the welding arc is caused to jump from one shell to another without being extinguished.

6. The method of welding a copper band around the outer periphery of rifle shells comprising the steps of indexing said shells through a plurality of working stations, welding said copper band to said shells at one of said stations, applying an electrical contactor to said shells at said welding station and the station preceding it, rotating said shells about their own axes independently of said indexing movement at the indexing speed, impringing a stream of coolant at the point of weld at least when said shell is at said welding station, and said indexing movement being such that the welding arc is caused to jump from one shell to another upon indexing without being extinguished or interrupted.

7. The method according to claim 6 further characterized by feeding a wire connected to a source of electrical potential toward the shell in said welding station in a generally vertical direction, feeding a second copper wire toward said shell in a substantially horizontal direction, and shielding the point of juncture of said wires and said shell with an inert gas.

8. Apparatus for welding bands on shells comprising a drum for holding a plurality of shells, means for indexing said drum through a plurality of work stations, means to rotate said shells independently of said indexing means about their own axes, means to load said shells on said drum at one of said stations, means to weld a copper band on said shells at another of said stations, current collecting means having electrical contact with said shells at said welding station and the next preceding station, said indexing means operative to move said shells whereby the welding arc is caused to jump from one shell to another without being extinguished or interrupted, and means to discharge said shells from said drum.

9. Apparatus according to claim 8 further characterized by means to supply coolant impinging directly at the point of weld and said coolant supplying means being retractable from said shells for ejection thereof from said drum.

10. Apparatus for welding bands on workpieces comprising a drum for holding a plurality of workpieces said drum having a common shaft, a plurality of axially spaced and radially extending workpiece receiving collets, said collets being serrated on the workpiece engaging face thereof, means to rotate said collets independently of the movement of said central shaft, spring-loaded cartridge units adapted to hold said workpieces in said collets against said serrations, each of said cartridge units comprising a circular housing keyed to said shaft, an annular member slidably received in said housing having abrasion resistant tips extending therefrom toward said workpiece associated therewith and being of decreased inner diameter near the rear portion thereof thereby defining a flange, a coil spring adapted to abut against said flange and a fixed stop, means for moving said cartridge unit into and out of shell holding position for loading and ejection purposes, means operative to impinge a stream of coolant in said workpieces during welding operations, and means to index said drum.

11. Apparatus according to claim 10 further characterized by said means for moving said cartridges into and out of workpiece engaging position comprising a stationary cam encircling approximately the lower half of said drum in spaced relation thereto and said stationary cam having a generated end portion operative to wedge said cartridge units backwards thereby releasing said workpieces.

12. Apparatus according to claim 10 further characterized by said means to rotate said collets independently of said central shaft comprising brackets keyed to said shaft, pinion gear members journaled in said brackets for rotation, means holding said collets to said members, a sprocket adapted to cooperate with said members, and means to drive said sprocket including a variable speed drive.

13. Apparatus for welding bands on workpieces comprising a drum for holding a plurality of workpieces, said drum having an axial shaft, a plurality of radially extending and circumferentially spaced workpiece-receiving collets, said collets being serrated on the workpiece engaging face thereof, means adapted to hold said workpieces in said collets against said serrations, means for rotating said collets independently of the movement of said shaft, means to index said drum, valving fixtures positioned behind said collets and said holding means, conduits slidably received in said valving fixtures, means to extend and retract said conduits, means to supply coolant individually to said conduits, and said last mentioned means being operative to supply coolant to the individual conduits only when the same are extended.

14. Apparatus according to claim 13 further characterized by said means to extend and retract said conduits comprising a pair of fluid cylinders spaced about said drum whereby said conduits do not interfere with the loading and ejection of said workpieces.

15. Apparatus for welding bands on workpieces comprising a drum for holding a plurality of workpieces, a plurality of radially extending and circumferentially spaced workpiece receiving collets on said drum, means to index said drum, means to rotate said collets independently of said drum, spring-loaded cartridge units adapted to hold said workpieces in said collets, means operative to impinge a stream of coolant under the point of weld during said welding operations, a welding head, and a spring-loaded current collecting shoe in electrical contact with the collet under said welding head and the preceding collet.

16. The method of arc welding a plurality of workpieces in successive relation which comprises the steps of moving a plurality of workpieces through a plurality of working stations, welding said workpieces at one of said stations, moving said workpieces at a predetermined time and speed whereby the welding arc is caused to jump from one workpiece to another without being interrupted or extinguished, and rotating said workpieces about their own axes at least while at said welding station.

17. The method of arc welding a plurality of workpieces in successive relation which comprises the steps of moving a plurality of workpieces through a plurality of working stations, welding said workpieces at one of said stations, moving said workpieces at a predetermined time and speed whereby the welding arc is caused to jump from one workpiece to another without being interrupted or extinguished, feeding a first metallic wire in a generally vertical direction toward said welding station, feeding a second metallic wire in a direction substantially normal to the direction of said first wire, and melting said wires whereby the same are deposited on said workpieces.

18. The method of arc welding a metal layer on desired portions of workpieces comprising the steps of moving said workpieces in successive relation through a plurality of working stations, welding a metal layer on said workpieces at one of said stations, moving said workpieces at a predetermined time and speed whereby the welding arc is caused to jump from one workpiece to another without being interrupted or extinguished, maintaining effective electrical contact between the workpiece in said welding station and the workpiece in the preceding station, impinging a stream of cooling fluid at the point of weld at said welding station, and rotating said workpieces about their own axes in the direction of movement of said workpieces.

19. Apparatus of the character described comprising a plurality of workpiece-receiving collets, means to index said collets through a plurality of working stations, means to arc weld said workpieces at one of said stations, current collecting means having electrical contact with the workpiece at said welding station and the next preceding station, said means to index operative to move said collets whereby the welding arc is caused to jump from one workpiece to another without being extinguished or interrupted, means for holding said workpieces in said collets, and said last mentioned means comprising individual pressure applying means adapted to engage each of said workpieces.

20. Apparatus according to claim 19 further characterized by means for rendering said individual pressure applying means inoperative while the workpieces are within at least a portion of said working stations, and said means for rendering inoperative comprising cam means to retract said yieldable pressure applying means.

References Cited in the file of this patent
UNITED STATES PATENTS

| | | |
|---|---|---|
| 1,530,469 | Adams | Mar. 24, 1925 |
| 2,295,702 | Wissler | Sept. 15, 1942 |
| 2,301,763 | Wagner | Nov. 10, 1942 |
| 2,390,596 | Larsen | Dec. 11, 1945 |
| 2,682,598 | Macoy | June 29, 1954 |
| 2,709,213 | Gibson | May 24, 1955 |
| 2,729,578 | Hedlund et al. | Jan. 3, 1956 |